May 14, 1929. C. W. HERR 1,713,281
AUTOMATIC SHUTTER FOR AUTOMOBILE RADIATORS
Filed Dec. 10, 1927
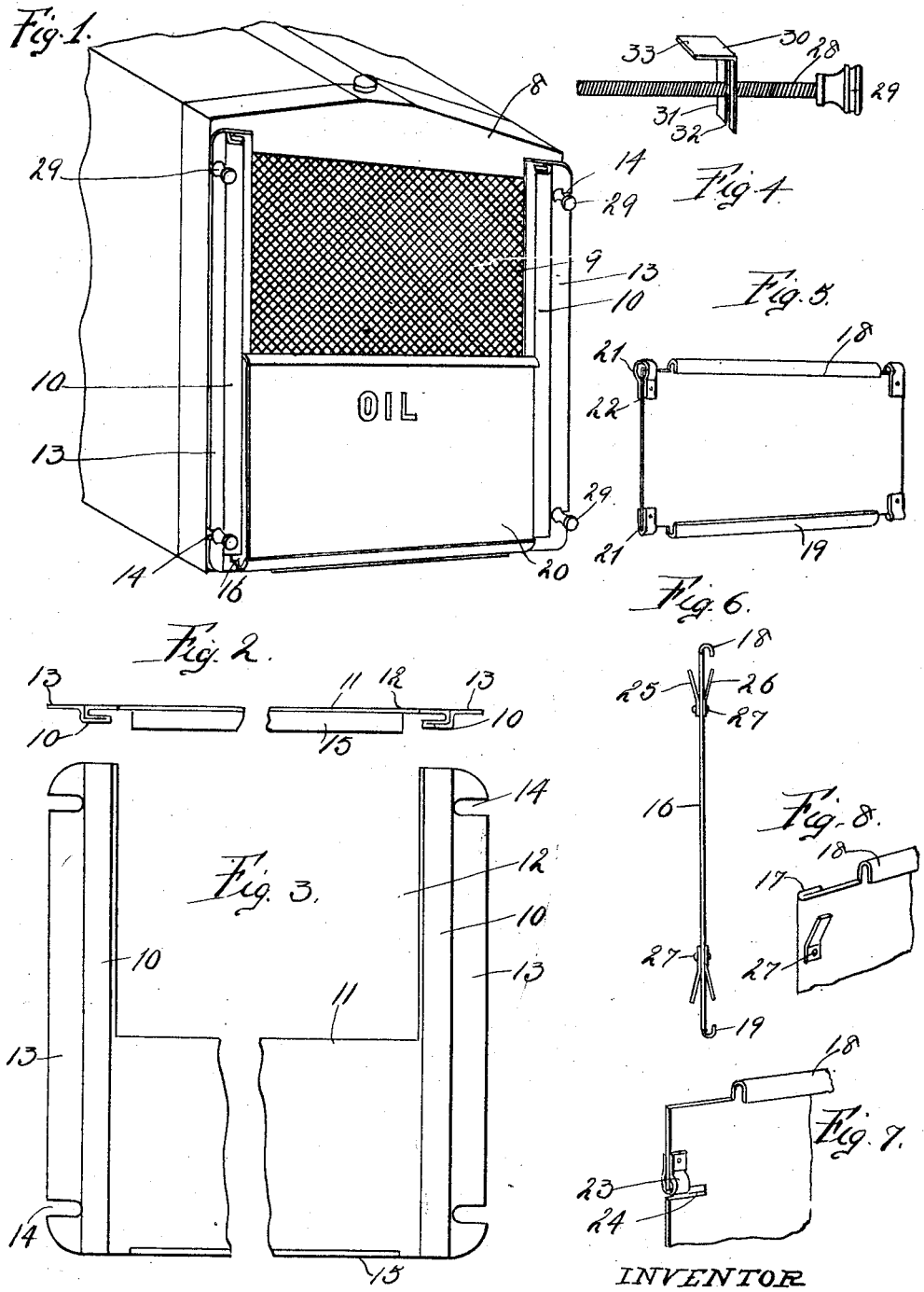
INVENTOR.
Charles W. Herr
By W. W. Williamson Atty.

Patented May 14, 1929.

1,713,281

UNITED STATES PATENT OFFICE.

CHARLES W. HERR, OF PHILADELPHIA, PENNSYLVANIA.

AUTOMATIC SHUTTER FOR AUTOMOBILE RADIATORS.

Application filed December 10, 1927. Serial No. 239,206.

My invention relates to new and useful improvements in an automatic shutter for automobile radiators, the same being an improvement upon the structure illustrated and described in my copending application, Serial No. 136,214, filed September 18, 1926, and has for its primary object to provide means for floating the shutter between springs in vertically arranged guides, whereby the jarring of the automobile will cause the shutter to descend to an open position if said shutter is in a raised or closed position.

Another object of the invention is to so fashion the shutter that the flanges provided for strengthening the same may be utilized for holding a demountable advertising display card.

A further object of the invention is to provide a simple and improved means for mounting the entire shutter structure on an automobile radiator, the said fastening means being so constructed that it may be readily adjusted to provide various tensions on the shutter structure and which may be readily manipulated to quickly remove or replace said shutter structure.

A still further object of the invention is to fashion the frame member from a single sheet of metal so as to provide, a panel, a stop at the lower edge thereof, guideways and side or attaching flanges. Such a construction produces a more compact, neater appearing and stronger unit than when made from several parts.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 1, is a conventional, perspective view of an automobile radiator and component parts showing my improved automatic shutter connected therewith:

Fig. 2, is an enlarged upward edge view of the frame with the central portion broken away.

Fig. 3, is an enlarged front elevation of the frame illustrated in Fig. 2.

Fig. 4, is an enlarged side elevation of the fastening means for mounting the shutter structure on the radiator, the plate being shown in a perspective position which assumes on the spring.

Fig 5, is a perspective view on the reduced scale of the shutter member illustrating one form of spring.

Fig. 6, is an edge view of the shutter member on an enlarged scale showing another form of spring.

Fig. 7, is a fragmentary perspective view of a shutter member showing the spring illustrated in Fig. 5 differently arranged on the shutter member.

Fig. 8, is a fragmentary, perspective view of the shutter member illustrating one method of stiffening the vertical edges.

In carrying out my invention as herein embodied, 8 represents the usual radiator of an automobile including the tubular structure 9 connected with the usual upper and lower tanks. As is well known, the radiator is designed for use as a heat extractor so that air passing between the tubular structure will remove the heat caused by the hot water passing through said tubular structure. This arrangement tends to cause the water to freeze in very cold weather, while the automobile is standing still, and in such types of automobiles that use no pump for the circulation of the water, said water will even freeze in the tube while the automobile is running, and this is almost invariably true of the lower portion of the radiator.

It is my intention to so construct the shutter referred to above, that it may be closed when the automobile is standing still so as to retain the accumulated heat under the automobile hood developed by the running of the motor, but to gradually open the shutter member automatically during the progress of the automobile over a road bed.

To accomplish this, I provide a pair of guideways 10, substantially U-shaped in cross sections as plainly shown in Fig. 2 and having their lower portions connected to a panel 11. I prefer to form the panel and guideways and other component parts from a single sheet of suitable metal and fashion the same into the desired form by cutting out a section to produce the aperture 12 above the panel 11 and then bending the portions on both sides of the panel and at both sides of the aperture in such manner as to provide two ply guideways 10 from which project the side flanges 13. In these flanges are formed notches 14 for a purpose to be hereinafter described.

Also a portion of the metal at the lower edge of the panel 11 is bent outward to provide a bottom flange or stop 15 and this is preferably of less length than the width of the panel. This bottom flange serves the purpose of stiffening the structure to prevent transverse bowing thereof, as well as acting as a stop for the shutter member which will be presently described.

In the guide ways is slidably mounted the shutter member 16 which, if found desirable, may have its vertical edges turned back upon itself as indicated at 17, Fig. 8, but if constructed of sufficiently stiff material, the said turned back edges may be eliminated as they are merely used for stiffening purposes. The upper and lower horizontal edges of the shutter member are bent over in spaced relation to the body of the shutter member to form flanges 18 and 19 for the reception of an advertising display card 20, and in addition, said flanges stiffen the shutter member transversely and the upper one of said flanges acts as a hand hold whereby the shutter may be manually elevated for moving it into a closed position. The flanges 18 and 19 are of less length than the body of the shutter member so as to be located between guideways 10, while those portions of the body beyond the ends of the flanges project into said guideways.

On the vertical edges of the shutter member or on those portions which lie within the guideways, are mounted a plurality of springs so arranged as to open both sides of the guideways and both faces of the shutter member at each side or end of the latter. These springs, designated in Fig. 5, by the numeral 21, may each be in the form of a flat strip of resilient metal bent back upon itself with the ends fixed to opposite faces of the shutter member by a suitable fastening device 22 such as a rivet, while the bowed portion projects around the upper or lower edge of the shutter member.

A modification of this arrangement is illustrated in Fig. 7 wherein the same formation of spring indicated by the numeral 23, is reversed to the position shown in Fig. 5, and the body portion passes through a slot 24 formed in the body of the shutter member.

Still another form is shown in Fig. 6 wherein two springs 25 and 26 are mounted on opposite faces of the shutter member in the same locality and may be held by a single fastening device 27. It is to be understood that when the last mentioned construction is utilized, there are eight separate springs, four on each face of the shutter member or two at the top and bottom of each edge of said shutter member.

The different arrangements of the springs above described, all serve the same purpose in that they float the shutter member between springs which assure a relatively slow downward movement without any rattling whatever. While I have shown the pairs of springs as projecting in opposite directions in Fig. 6, it is to be understood that said pairs of springs may project in the same direction, either upwardly or downwardly as best suited for the purpose.

For mounting the entire shutter structure upon an automobile radiator, I use the fastening device shown in Fig. 4, which consists of a coil spring 28 with a knob 29 on one end and a clamping plate 30 relatively engaging the coils of the spring, said plate including a body 31 having an open end slot 32 and a portion bent at right angles to provide a finger hold 33.

The fastenings are projected through openings in the automobile radiator, as other spaces between or in the tubular structure thereof and the inner ends well stretched or expanded until the desired tension is obtained, after which the clamping plates are caused to engage coils of the springs adjacent the inner face of the radiator. After this has been done, it is only necessary to grasp the knobs of said fastening devices to extend the springs on the outside of the radiator which will permit registration of the notches 14 with said springs and when the knobs are released, they will engage the side flanges of the frame under the tension of the springs, to firmly hold the entire structure in place on the front of the radiator.

In practice, with the device mounted, as shown in Fig. 1, when the automobile is standing still, the shutter is raised to its elevated position so as to cover the upper portion of the radiator tubular structure 9. In such position, the circulation of air is stopped and the heat under the hood of the automobile will prevent the cooling system from freezing.

Upon starting to run the automobile, the jar incident to the passage of said automobile over the road way will cause the shutter member to gradually descend, due to the light pressure of the springs in the guideways, until it reaches the bottom flange or stop 15 on the frame or specifically at the lower end of the panel 11. When the shutter member engages the stop 15, the upper portion of the radiator tubular structure is exposed to the atmosphere so that the circulating medium will be cooled as is usual, but even then, the lower portion of the tubular structure will be shielded to prevent freezing, which sometimes occurs in very cold weather.

By providing the shutter member with the flanges 18 and 19, said shutter member will be stiffened laterally thereof and an advertising or other display card may be inserted between said flanges so that pedestrians and others may readily see the same.

Of course I do not wish to be limited to the exact details of construction as herein shown as these may be varied within the limits of the appended claims without departing from the spirit of my invention.

Having thus fully described my invention, what I claim as new and useful is:

1. The combination with an automobile radiator, of a frame mounted on the front of said radiator and including a pair of parallel spaced vertical guideways, a shutter member slidably mounted in said guideways, and means carried by said shutter member and engaging both sides of the guideways and acting upon both faces of the shutter member for floatingly mounting the shutter in the frame and permitting a retarding descent thereof, due to jarring of the automobile to which the radiator is connected.

2. The combination with an automobile and its radiator, of guideways mounted in spaced vertical positions, on the radiator, a shutter member slidably mounted in the guideways, and spring elements associated with both faces of the shutter member at opposite ends thereof and coacting with both sides of the guideways to hold said shutter member in an elevated position, but permitting the retarding descent of said shutter member when the automobile is in motion, due to jarring of the latter.

3. An automatic shutter for automobile radiators comprising a frame produced from a single sheet of metal so fashioned as to provide a panel, a guideway at each side of the panel extending from the lower edge of said panel to a point above the upper edge thereof, side flanges having apertures therein to receive fastening devices for securing the frame to the radiator, and a bottom flange or stop projecting outwardly from the lower edge of the panel, a shutter member slidably mounted in the guideways and adapted to bridge the space between the guideways above the panel, and means carried by said shutter member and engaging the guideways to hold said shutter member across the space between the guideways while permitting a retarding descent thereof when the automobile is in motion due to the jarring thereof until it rests upon the flange at the lower end of the panel.

4. The combination with an automobile radiator, of a frame, a shutter slidably mounted in said frame, means carried by the shutter member and engaging the walls of the guideways to hold said shutter member in an elevated position while permitting a retarding descent thereof when the automobile is in motion, and fastening means carried by the radiator and engaging the frame to hold the latter on the radiator, said fastening means comprising springs for projection through apertures in the radiator, knobs on the outer ends of said springs, and slotted clamping plates for engagement between selected coils of the springs and engaging the rear face of the radiator.

5. The combination with an automobile radiator, of a frame having notches in the side edges, a shutter slidably mounted in the frame, and fastening members carried by the radiator for registration with the notches, each of said fastening members comprising a spring, a knob on the outer end thereof, and a slotted clamp plate for selective engagement with the coils of said spring.

6. A device of the kind described comprising a frame and a shutter slidable vertically in said frame and having flexible means on opposite faces for supporting said shutter in an elevated position and automatically permit it to drop in said frame due to the jarring of the latter.

7. A device of the kind described comprising a frame having a vertical side grooves and a shutter slidable in said grooves and provided with flexible means disposed on opposite faces thereof and engageable with the groove walls to maintain the shutter in an elevated closed position and automatically release the same and permit it to descend to an open position when the frame is jarred.

8. A device of the kind described comprising a member for attachment to an automobile and provided with grooves and a shutter slidably mounted in said grooves and provided with means for forming a plurality of resilient bearings between the shutter and groove walls to automatically release the shutter when in an elevated position and permit it to descend as the frame is jarred due to vibration of the automobile to which the device is attached.

9. A device of the kind described comprising a frame and a shutter vertically slidable in said frame and having resilient fingers on both faces at both ends adjacent the top and bottom edges to engage the frame and hold the shutter in elevated position and automatically release said shutter due to jarring of the frame and thereby permitting said shutter to descend in said frame.

In testimony whereof, I have hereunto affixed my signature.

CHARLES W. HERR.